(12) United States Patent
Yuschak et al.

(10) Patent No.: US 10,232,455 B2
(45) Date of Patent: Mar. 19, 2019

(54) WELDED, LAMINATED APPARATUS, METHODS OF MAKING, AND METHODS OF USING THE APPARATUS

(75) Inventors: Thomas Yuschak, Lewis Center, OH (US); Anna Lee Tonkovich, Dublin, OH (US)

(73) Assignee: Velocys, Inc., Plain City, OH (US)

( * ) Notice: Subject to any disclaimer, the term of this patent is extended or adjusted under 35 U.S.C. 154(b) by 2140 days.

(21) Appl. No.: 13/039,303

(22) Filed: Mar. 2, 2011

(65) Prior Publication Data

US 2012/0171517 A1 Jul. 5, 2012

Related U.S. Application Data

(60) Provisional application No. 61/309,851, filed on Mar. 2, 2010.

(51) Int. Cl.
| | |
|---|---|
| *B23K 9/00* | (2006.01) |
| *B23K 1/00* | (2006.01) |
| *B23K 9/04* | (2006.01) |
| B23P 15/26 | (2006.01) |
| F28F 9/02 | (2006.01) |
| F28F 3/00 | (2006.01) |
| B23K 101/14 | (2006.01) |

(52) U.S. Cl.
CPC .......... *B23K 1/0012* (2013.01); *B23K 9/0052* (2013.01); *B23K 9/04* (2013.01); *B23K 2101/14* (2018.08); *Y10T 29/49718* (2015.01); *Y10T 137/0318* (2015.04); *Y10T 137/85938* (2015.04); *Y10T 428/12903* (2015.01)

(58) Field of Classification Search
CPC .............. B23K 1/0012; B23K 2201/14; B23K 9/0052; B23K 9/04; B23K 9/00; Y10T 137/0318; F28F 3/02; F28F 9/02; F28F 3/00; B23P 15/26

USPC ....... 219/56, 136, 137.2; 422/145, 198, 200, 422/201; 228/183, 203; 29/890.054, 29/890.03, 904, 890.052; 165/158, 165, 165/166

See application file for complete search history.

(56) References Cited

U.S. PATENT DOCUMENTS

| | | |
|---|---|---|
| 3,176,763 A | 4/1965 | Frohlich |
| 4,651,811 A | 3/1987 | Frauenfeld et al. |
| 5,250,489 A | 10/1993 | Dalla Betta et al. |
| 5,512,250 A | 4/1996 | Betta et al. |
| 5,690,763 A | 11/1997 | Ashmead et al. |

(Continued)

FOREIGN PATENT DOCUMENTS

| | | |
|---|---|---|
| FR | 2640620 A1 | 6/1990 |
| GB | 1227464 | 4/1971 |
| JP | 2007-333353 | 12/2007 |

OTHER PUBLICATIONS

International search report for PCT/US2011/026933, dated Sep. 2, 2012.

(Continued)

*Primary Examiner* — Michael G Hoang
(74) *Attorney, Agent, or Firm* — Frank Rosenberg (57) ABSTRACT

The invention describes methods of welding onto laminated devices using a low temperature welding process. Also described are laminated devices with welds that do not disrupt a brazed core block of sheets in the laminated devices. Novel laminated devices with welded features for servicing the devices are also described.

1 Claim, 8 Drawing Sheets

(56) References Cited

U.S. PATENT DOCUMENTS

| | | |
|---|---|---|
| 5,700,434 A | 12/1997 | Gaiser |
| 5,714,735 A * | 2/1998 | Offer ............................ 219/136 |
| 5,846,494 A | 12/1998 | Gaiser |
| 5,858,314 A | 1/1999 | Hsu et al. |
| 5,961,933 A | 10/1999 | Casanave et al. |
| 6,060,524 A | 5/2000 | Casanave |
| 6,183,703 B1 | 2/2001 | Hsu et al. |
| 6,192,596 B1 | 2/2001 | Bennet et al. |
| 6,193,501 B1 | 2/2001 | Masel et al. |
| 6,220,497 B1 | 4/2001 | Benz et al. |
| 6,672,502 B1 | 1/2004 | Paul et al. |
| 6,773,684 B2 | 8/2004 | Lesieur et al. |
| 6,932,951 B1 | 8/2005 | Losey et al. |
| 7,014,835 B2 * | 3/2006 | Mathias et al. ............... 423/652 |
| 7,021,216 B1 | 4/2006 | Dragne et al. |
| 9,157,686 B2 | 10/2015 | Amaya |
| 2001/0018140 A1 | 8/2001 | Hermann et al. |
| 2004/0222200 A1 * | 11/2004 | Bonnet et al. ........... 219/121.14 |
| 2005/0067466 A1 | 3/2005 | Boegli et al. |
| 2006/0090887 A1 * | 5/2006 | Kato et al. .................... 165/166 |
| 2007/0214641 A1 | 9/2007 | Bonnet et al. |
| 2007/0284095 A1 * | 12/2007 | Wang et al. .................. 165/166 |
| 2010/0224609 A1 * | 9/2010 | Rose ........................ 219/137 R |

OTHER PUBLICATIONS

Feng J, Zhang H, He P, "The CMT short-circuiting metal transfer process and its use in thin aluminium sheets welding", Materials and Design 30 (2009)1850-1852.

Zhang HT, Feng JC, He P, Zhang BB, Chen JM, Wang L, "The arc characteristics and metal transfer behaviour of cold metal transfer and its use in joining aluminium to zinc-coated steel", Materials Science and Engineering A 499 (2009) 111-113.

Official Action from JP Patent Application 2012-556230 dated Mar. 17, 2015.

EP Official Action of Nov. 14, 2017 for EP Patent Application No. 11716680.1.

Official Action from Korean Patent application No. 10-2012-7024364, dated Mar. 26, 2018.

Official Action from JP patent application No. 2012-556230 dated Mar. 30, 2016.

* cited by examiner

WELDED, LAMINATED APPARATUS, METHODS OF MAKING, AND METHODS OF USING THE APPARATUS

RELATED APPLICATIONS

This application claims priority to U.S. provisional patent application 61/309,851, filed 2 Mar. 2010.

INTRODUCTION

Laminated devices are often formed by brazing together metal sheets, using an added material (braze) interlayer between adjacent sheets in order to achieve adhesion and or joining and or a substantially hermetic seal between two or more layers. A problem with welding an additional piece on to such a laminated device in proximity to braze boundary layers is that conventional welding often results in cracks that form between the sheets. Laminated apparatus, especially microchannel apparatus can be deformed or weakened by welding processes. Thus, there is a need for methods repairing cracks in laminated apparatus and also for laminated apparatus that is less susceptible to cracking.

SUMMARY OF THE INVENTION

In one aspect, the invention comprises a method of welding a metal onto laminated apparatus, comprising: providing laminated apparatus comprising sheets of metal bonded together, at least in part, by a braze composition disposed between the sheets; applying a metal onto the laminated apparatus by a welding technique wherein a wire moves in a reciprocating motion (moving alternatively back and forth) and wherein a spark is generated when the wire touches and/or is pulling away from the laminated apparatus and wherein molten metal is applied to the surface while the wire moves away from the surface. Typically, the process is carried out in an inert atmosphere such as by a shroud of inert gas blowing around the wire and apparatus. It may be the case that a braze composition is present between all the sheets; however, in some devices, there is a braze composition only between some sheets—this could be the case, for example, where some sheets are prebonded by diffusion bonding (to form a subassembly) and the resulting diffusion-bonded laminated pieces are subsequently joined to single sheets or another diffusion-bonded laminated piece by brazing.

In some alternative embodiments, the method can be characterized as intermittent arc discharge with a reciprocating welding wire. Likewise, molten metal is applied to the surface while the wire moves away from the surface.

Further, the method could be used to weld a solid metal article to a brazed, laminated structure. The solid article could be a header, a footer, and inlet or outlet nozzle, an enclosure (see below), a structural support element useful either during operation or in a ambient state, a connector used for lifting or supporting the laminated device, or other useful component.

This process can be conducted with very low heating of the laminated apparatus and, in preferred embodiments, within 30 seconds of active welding (according to the inventive process) and without the application of liquid quenching, the temperature of the laminated article is 100° C. or less throughout the entire apparatus. In another embodiment, the temperature of the laminated article is 50° C. or less within 30 seconds of completing the welding step. This contrasts with conventional welding processes in which the laminated article is much hotter, typically red hot, during the welding and for several minutes after welding has ceased.

The inventive process enables the production of unique structures, and the invention includes apparatus made by the inventive process. Generally, the process results in a structure in which there is little diffusion, at the welding site, of welding composition into the core block. The core block comprises laminated sheets which have been joined into a stack. Core blocks may have more than 10 or more than 100 or more than 1000 layers.

In addition, the invention provides welded, laminated apparatus. The laminated apparatus comprises: a core block comprising sheets of metal bonded together, at least in part, by a braze composition disposed between the sheets; a welding composition disposed on the core block and adhering to the braze composition; wherein the welding composition has a composition that differs from the composition of the braze composition; and wherein the welding composition is diffused 2 mm or less (preferably 1.0 mm or less, preferably 0.5 mm or less, more preferably 0.3 mm or less) into the core block. Typically, diffusion into the core block can be measured by microscopy on a cross-section of the core block.

Preferably, the core block comprises sheets of metal bonded together, at least in part, by a braze composition disposed between the sheets. The core block comprises stacked sheets, and may include manifolds that are integral to the sheets, but the core block does not include external manifolds, handles, or external tubes.

In a further aspect, the invention provides microchannel apparatus, comprising: a core block comprising sheets of metal bonded together; plural microchannels disposed within the core block; the plural microchannels comprising plural apertures on one side of the core block; a solid-walled enclosure that encloses the plural apertures within a single, contiguous space; wherein the solid-walled enclosure comprises a solid, continuous wall that is welded on one side to the core block by a weld material; wherein the continuous wall has an aspect ratio of at least 10:1 of height to thickness (where height is the direction that the wall projects from said one side of the core block, and thickness is perpendicular to height and is the commonly-used understanding of wall thickness.

The invention also includes any of the apparatus or methods described in the section entitled Detailed Description of the Invention. For example, the invention includes a method in which a weld is formed over apertures (channel openings) and weld material is then removed to reopen the channels (see Example 2). The invention also includes apparatus in which sheets comprising channels protrude from a face of a core block (see FIG. 3).

Advantages of the invention include the reduction or elimination of leaks and cracks. The welding method is particularly useful for laminated articles in which an interlayer has a melting point less than that of the laminated sheets, which have a higher melting point. Welds can be made along cracks, parallel to layers within a laminate, perpendicular to layers within a laminate, or at any angle relative to layers in a laminate. It is difficult to weld onto a block which has been formed from brazing parallel sheets. This is because the brazing material has a low melting point compared to the sheet material, which is suitable for obtaining good brazing. During brazing, the braze material moves around and quite effectively fills the voids between the sheets. Subsequent welding onto a brazed article results in re-melting of braze material in the warm location of the weld, resulting in diffusion of weld material into braze material. While not wishing to be bound by theory, when the article cools after welding, the welding and brazing compositions may cool at different rates, and the material joining the sheets becomes non-uniform in that location, which may cause cracks in the filler material between the sheets. These cracks interfere with the integrity of the device, which, if used for fluid processing, may result in leaks. These problems are magnified for devices with many layers, and is also magnified for devices with longer dimensions, and longer welds, all of which contribute to cracks, which either must be detected and repaired, or the article scrapped. This invention avoids these problems by applying new welding techniques (e.g. CMT, with a passing reference to fiber laser welding) to minimize the diffusion of weld composition into braze material in a brazed laminated article.

DETAILED DESCRIPTION OF THE INVENTION

Figure 1:
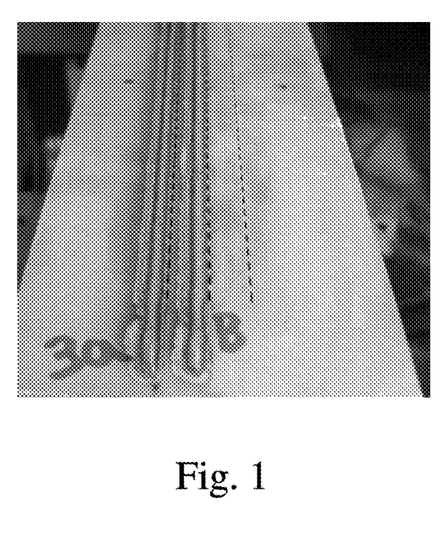
FIG. 1 shows weld seams.

The appearance of the weld seam on a part after welding along a laminate seam can have a distinct semicylinder or partial cylinder shape (see FIG. 1). The region is typically fairly straight if it is made by a robotic or automated welding process, and in some preferred embodiments, the weld seam is substantially straight as illustrated in the figure below. The radius of the semicylinder that sits above the laminated part is typically less than 10 mm and preferably between 0.01 mm to 5 mm, with a more preferable range from 0.1 mm to 2 mm.

In some embodiments, the weld has the semicircular shape described above. The metal sheets have a composition that is different than the braze interlayer. In some embodiments, the weld composition is different from the composition of the metal sheets.

Figure 2:
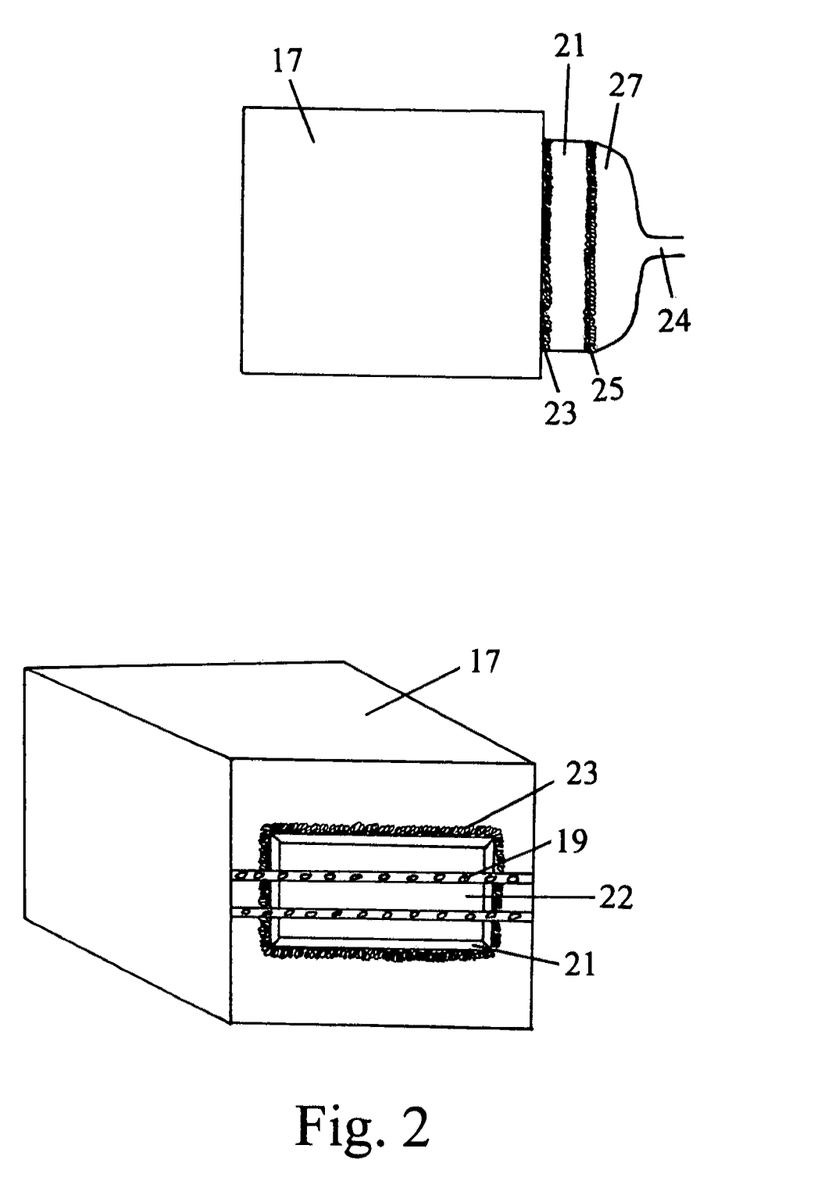
FIG. 2 schematically illustrates a perspective view of a core block with an attached enclosure and a side view with an optional connected manifold enclosure and piping.

The invention includes microchannel apparatus schematically illustrated in FIG. 2, comprising: a core block 17 comprising sheets of metal bonded together; plural microchannels disposed within the core block; the plural microchannels comprising plural apertures 19 on at least one side of the core block; a solid-walled enclosure 21 that encloses the plural apertures within a single, contiguous space 22; wherein the solid-walled enclosure comprises a solid, continuous wall that is welded on one side to the core block by a weld material 23; wherein the continuous wall has an aspect ratio of at least 10:1 of height to thickness (where height is the direction (corresponding to 21) that the wall projects from said one side of the core block, and thickness is perpendicular to height and is the commonly-used understanding of wall thickness); and wherein the side of the solid-walled enclosure that is opposite to the side that is welded to the core block may comprise a connection to a conduit 27. The connection to the conduit 25 may comprise a conventional weld, while the connection of the enclosure to the core block is preferably an inventive weld of the type described herein. Thus, typically, the connection to the conduit has a different composition and/or morphology than the weld material. The conduit may comprise piping 24. Preferably, the weld to the core block is formed by Cold Metal Transfer (CMT) welding. The CMT weld may alternatively be described in any of the ways provided herein. In less preferred embodiments, where the apparatus is used under low temperature and/or low corrosion conditions, a header space can be formed via a gasket connecting the enclosure with a conduit.

In addition to the use of CMT to join an enclosure to a brazed article, other low energy input methods of welding may be used to attach an enclosure or a header to a laminated device. For example, a fiber laser, such as with a Yb laser, may be used to join a solid metal article to a brazed article. The laser welding approach creates a narrow but deep penetration weld that is particularly useful for creating a structural joint on a pressure or load bearing part.

The invention also includes methods of making laminated apparatus comprising the use of CMT; preferably including CMT to weld the enclosure on the core block.

The apertures comprise inlets or outlets for fluid processing or ports used for instrumentation for process measurements and controls, diagnostics, or for use during manufacturing or refurbishment of the apparatus The invention also includes methods of accessing the plural microchannels through said plural apertures, comprising: breaking the connection between the enclosure and a conduit without disrupting the weld that attaches the solid-walled enclosure to the core block, and accessing the plural microchannels through the solid-walled enclosure and through the plural apertures.

The invention also includes reattaching the connection to re-attached piping.

After breaking the connection, tasks that could be conducted include: maintenance or inspection of the core block, including removing material (comprising for example, but not limited to catalyst, sorbents, fins, waveforms, and other inserted materials), adding material (catalyst, sorbents, fins, waveforms, inserts), and inspecting the quality and uniformity of the flow passages through diagnostic tests, including flow tests, and performing maintenance, such as cleaning or repair of the passageways.

The enclosure is a solid metal ring that mates with the brazed surface and is then used for subsequent welding of headers or footers to bring or remove fluids to a microchannel brazed device. The solid ring may be a unitary (preferably made by molding) part or made from two or four or more parts that are welded together to form a solid ring. In one embodiment for a square or rectangular face, it is preferable to form a ring using 4 straight parts with weld joints to form a contiguous square or rectangular ring. The advantage of a ring (which may be circular, square, rectangular, or other shape) is that the header or footer may be cut or ground off many times to have access to the channels after operation for catalyst refurbishment or for evaluation of changes to channels or for a cleaning or defouling step after process operation. It is envisoned that catalysts loaded in a microchannel device would be removed periodically (from every week to once every 10 years) and at that time, the header and or footer would need to be separated from the ring for such refurbishment. The initial welding across braze seams or joints or across laminates might only occur once in the life of a brazed device.

The inventive methods of servicing a laminated device provide significant advantages over methods that can be conducted using conventional apparatus (such as simple tub welds) since the apertures can be accessed without damaging the surface of the core block. Additionally, since the weld between the enclosure and the conduit can be removed by simple grinding (optionally vacuum grinding) rather than cutting; there is less contamination than conventional methods.

In some preferred embodiments of the invention, there is a weld across plural brazing layers (the layers between metal sheets). The weld can be parallel to the metal sheets, perpendicular to the metal sheets or at any desired angle with respect to metal sheets in a core block.

The invention also provides a method of using the any of the above-described apparatus comprising passing a fluid through channels in the core block, and a conducting a unit operation on the fluid as it passes through the channels. The apparatus may be used for processes such as heat exchange, mixing, heating, cooling (including a heat sink for electronic devices), chemical reaction, chemical separation. The apparatus may also comprise an electrochemical device, which utilizes a solid or liquid electrolyte and electrodes to obtain electrical work from a spontaneous chemical reaction (including but not limited to batteries and fuel cells), or conversely, to apply electrical work to generate chemical species (including but not limited to eletrolyzers, oxygen generators and reverse fuel cells), or to produce an electrical signal in response to a change in the device environment (including but not limited to sensors and analytical devices). The apparatus may also be a thermoelectric device. In some preferred embodiments, the apparatus is a chemical reactor.

In preferred embodiments, sheet thicknesses are 1 cm or less (such as may contain waveforms, engineered catalyst structures, fins, etc.), 2 mm or less, and in some embodiments 1 mm or less.

As used herein, the term "microchannel" refers to any conduit having at least one dimension (height, length, or width) (wall-to-wall, not counting catalyst) of 1 cm or less, including 2 mm or less (in some embodiments about 1.0 mm or less) and greater than 100 nm (preferably greater than 1 µm), and in some embodiments 50 to 500 µm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height.

In some embodiments, the laminated apparatus may comprise one or more waveforms. A "waveform" is a 3-dimensional contiguous piece of thermally conductive material that at least partially defines one or more microchannels. The waveform may have a gap between the waves that is in the microchannel dimension or may be larger. In exemplary form, this gap may be in the microchannel dimension because then heat is easily transferred to the long direction in the wave that separates the heat transfer channels before conducting down the more conductive wave form to the heat transfer channels. The waveform may be made of copper, aluminum, FeCrAlY, metals, oxides, or other materials. The waveform preferably has a thermal conductivity greater than 1 W/m-K.

As is standard patent terminology, "comprising" means "including" and neither of these terms exclude the presence of additional or plural components. For example, where a device comprises a lamina, a sheet, etc., it should be understood that the inventive device may include multiple laminae, sheets, etc. In alternative embodiments, the term "comprising" can be replaced by the more restrictive phrases "consisting essentially of" or "consisting of."

"Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

"A process of operating" means repairing, maintaining, refurbishing, or diagnosing; and may include preparations conducted prior to conducting unit operations, scheduled or unscheduled maintainence, or other uses of the apparatus.

Microchannel apparatus (such as microchannel reactors) preferably include microchannels (such as a plurality of microchannel reaction channels) and a plurality of adjacent heat exchange microchannels. The plurality of microchannels may contain, for example, 2, 10, 100, 1000 or more channels capable of operating in parallel. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. In some preferred embodiments, there may be multiple separate flow streams. One fluid stream may flow through a plurality of microchannels. A second fluid stream may flow through a second plurality of microchannels, or may flow through one or more macrochannels. During operation, heat exchange microchannels (if present) contain flowing heating and/or cooling fluids. Nonlimiting examples of this type of known reactor usable in the present invention include those of the microcomponent sheet architecture variety (for example, a laminate with microchannels) exemplified in U.S. Pat. Nos. 6,200,536 and 6,219,973 (both of which are incorporated by reference).

In many preferred embodiments, the microchannel apparatus contains multiple microchannels, preferably groups of at least 5, more preferably at least 10, parallel channels that are connected in a common manifold that is integral to the device (not a subsequently-attached tube) where the common manifold includes a feature or features that tend to equalize flow through the channels connected to the manifold. Examples of such manifolds are described in U.S. patent application Ser. No. 10/695,400, filed Oct. 27, 2003 which is incorporated herein. In this context, "parallel" does not necessarily mean straight, rather that the channels conform to each other. In some preferred embodiments, a microchannel device includes at least three groups of parallel microchannels wherein the channel within each group is connected to a common manifold (for example, 4 groups of microchannels and 4 manifolds) and preferably where each common manifold includes a feature or features that tend to equalize flow through the channels connected to the manifold.

Microchannels can incorporate materials paced inside the microchannels, such as catalysts, sorbents, or other materials. Such materials may be incorporated into the channels as particulates or small pieces Catalysts, sorbents, or other coatings can be applied onto the interior surface of a microchannel using techniques that are known in the art such as wash coating. Techniques such as CVD or electroless plating may also be utilized. In some embodiments, impregnation with aqueous salts is preferred. Pt, Rh, and/or Pd are preferred in some embodiments. Typically this is followed by heat treatment and activation steps as are known in the art. Other coatings may include sol or slurry based solutions that contain a catalyst precursor and/or support. Coatings could also include reactive methods of application to the wall such as electroless plating or other surface fluid reactions.

The sheets of metal in a laminated apparatus are preferably a stainless steel or a superalloy, such as a nickel, cobalt, or iron based superalloy. Other examples include, but are not limited to, FeCrAlY, titanium alloys, and Ni—Cr—W superalloy. Sheets typically range in thickness from 10 μm to 1 cm, more typically 100 μm to 5 mm. Sheets may be solid (such as dividing walls) and may contains holes or slots as well as partially etched channels and other features such as is known in the art of laminated devices.

Prior to brazing surfaces are preferably cleaned and may be coated with a surface layer such as a Ni layer.

Materials for brazing are well known in the art. Brazing is typically conducted in vacuum or an inert atmosphere. As is well known, during brazing, a relatively low temperature brazing material is melted between metal sheets and then some diffusion occurs between the brazing material and the sheets and, after cooling, a braze composition (which typically differs somewhat from the composition of the original brazing material) remains between the sheets. Techniques such as microscopy and other known metallurgical techniques can be used to identify and characterize a braze composition between sheets in a laminated device.

The present invention is generally applicable to brazed laminates. For nickel-based metal sheets, a preferred brazing material is NiP. One standard braze material is BNi-6 or a combination of 10-12.5% Phosphorous in nickel. Brazing often uses a transient liquid phase (TLP) interlayer which acts as a melting point depressant for a metal. At an elevated temperature that exceeds the operational temperature requirement but does not approach the melting point of the parent material or a temperature which contributes significant diffusion bonding or grain growth of metals across laminate shim boundaries, the TLP transforms from a solid to a liquid phase to flow and fill all voids between layers. As the braze process occurs the TLP depressant material, which may be phosphorous or boron or others diffuses from the braze interlayer to change the melting point of the metal.

Some nonlimiting examples of brazing compositions include the following each of these braze interlayers would be advantaged by the described invention.

| MBF Alloy | AWS & AMS Classifications | Nominal Composition, wt. % | | | | | | | |
|---|---|---|---|---|---|---|---|---|---|
| | | Cr | Fe | Si | C* | B | P | W | Co | Ni |
| 15 | | 13.0 | 4.2 | 4.5 | 0.03 | 2.8 | — | — | 1.0* | Bal |
| 20 | AWS BNi2/AMS 4777 | 7.0 | 3.0 | 4.5 | 0.06 | 3.2 | — | — | — | Bal |
| 30 | AWS BNi3/AMS 4778 | — | — | 4.5 | 0.06 | 3.2 | — | — | — | Ba |
| 50 | AWS BNi-5a | 19.0 | — | 7.3 | 0.08 | 1.5 | — | — | — | Bal |
| 51 | AWS BNi-5b | 15.0 | — | 7.25 | 0.06 | 1.4 | — | — | — | Bal |
| 55 | | 5.3 | — | 7.3 | 0.08 | 1.4 | — | — | — | Bal |
| 60 | AWS BNi6 | — | — | — | 0.10 | — | 11.0 | — | — | Bal |
| 80 | | 15.2 | — | — | 0.06 | 4.0 | — | — | — | Bal |

Foils are available with more rigid dimensional tolerances as specialty or "A" grades
*Maximum concentration

| MBF Alloy | AWS & AMS Classifications | Melting Temp. °C. (°F.) | | Braze Temp. (Approx.) °C. (°F.) | Density g/cm³ (lbm/in³) |
|---|---|---|---|---|---|
| | | Solidus | Liquidus | | |
| 15 | | 965 (1769) | 1103 (2017) | 1135 (2075) | 7.82 (0.283) |
| 20 | AWS BNi2/AMS 4777 | 969 (1776) | 1024 (1875) | 1055 (1931) | 7.88 (0.285) |
| 30 | AWS BNi3/AMS 4778 | 984 (1803) | 1054 (1929) | 1085 (1985) | 8.07 (0.291) |
| 50 | AWS BNi-5a | 1052 (1924) | 1144 (2091) | 1170 (2138) | 7.70 (0.278) |
| 51 | AWS BNi-5b | 1030 (1886) | 1126 (2058) | 1195 (2183) | 7.73 (0.278) |
| 55 | | 950 (1742) | 1040 (1904) | 1070 (1958) | 7.72 (0.279) |
| 60 | AWS BNi6 | 883 (1621) | 921 (1688) | 950 (1742) | 8.14 (0.294) |
| 80 | | 1048 (1918) | 1091 (1996) | 1120 (2045) | 7.94 (0.278) |

In preferred embodiments, a wire in the inventive welding process preferably has a similar, or the same, composition as the metal in the metal sheets of the laminate. In preferred embodiments, the wire has any of the compositions as described above for the metal sheets.

The phase diagram of Ni—P shows a eutectic point near 11% phosphorus by weight in nickel. As the phosphorous diffuses away from the interlayer into the adjacent metal surface, the local weight percent of nickel is reduced and the composition changes which solidifies the braze interlayer. One advantage of the braze process is that the resulting brazed device can withstand a higher braze temperature because the resultant phosphorous depleted interlayer region will only remelt at a higher temperature per the phase diagram. Unfortunately, the conventional welding temperature reaches the melt temperature of the parent material (~1400 to 1500° C. for Stainless 300 series), often a nickel containing substance and the result is a remelt of the braze interlayer and the formation of cracks. The cracks both create leak problems for an operational device (heat exchanger, reactor, separations unit, mixer, or other single or combined unit operation) and mechanical integrity problems if the device is intended for high pressure and or temperature operation. Difficulties with welding over short sections of brazed devices and then inspecting, detecting, and repairing cracks has been encountered. This problem becomes even more challenging when attempting to weld along long sections of a brazed device with hundreds, or even thousands of thin sheets.

One conventional solution to avoid this problem is to braze, rather than weld, connections to brazed devices.

The invention provides a new use and a new advantage for a welding technique known as cold metal transfer ("CMT"). This technique is described at http://www.welding-robots.com/applications.php.?app=cold+metal+transfer as follows:

"Cold" is a relative term in perspective to welding. Cold Metal Transfer welding is commonly referred to as CMT. The workpieces to be joined as well as the weld zones remain considerably "colder" in the cold metal transfer process (CMT) than they would with conventional gas metal arc welding.

The cold metal transfer process is based on short circuiting transfer, or more accurately, on a deliberate, systematic discontinuing of the arc. Results are a sort of alternating "hot-cold-hot-cold" sequence. The "hot-cold" method significantly reduces the arc pressure. During a normal short circuiting transfer arc, the electrode is distorted while being dipped into the weld pool, and melts rapidly at high transfer arc current. A wide process window and the resulting high stability define the cold metal transfer process. Automation and robot-assisted applications is what the process is designed for.

The major advancement is that the motions of the wire have been integrated into the welding process and into the overall management of the procedure. Every time short circuiting occurs, the digital process control interrupts the power supply and controls the retraction of the wire. The forward and back motion takes place at a rate of up to 70 times per second. The wire retraction motion aides droplet detachment during the short circuit. The fact that electrical energy is converted into heat is both a defining feature and sometimes critical side effect of arc welding. Ensuring minimal current metal transfer will greatly reduce the amount of heat generated in the cold metal transfer process. The restricted discontinuations of the short circuit leads to a low short-circuit current. The arc only inputs heat into the materials to be joined for a very short time during the arcing period because of the interruption in the power supply.

The reduced thermal input offers advantages such as low distortion and higher precision. Benefits include higher-quality welded joints, freedom from spatter, ability to weld light-gauge sheet as thin as 0.3 mm, as well as the ability to join both steel to aluminum and galvanized sheets.

Additional description of the CMT welding process is presented by Feng et al. in "The CMT short-circuiting metal transfer process and its use in thin aluminum sheets welding," Materials and Design 30 (2009) 1850-1852.

A process known as controlled short circuit ("CSC") operates similarly to CMT, and, for purposes of the present invention, comes within the term "CMT." Frequency of the wire motion is preferably in the range of 10 to 30 Hz, but other frequencies are also useful. In some embodiments, travel speed of the wire along the surface is preferably less than about 30 inch per minute; in some embodiments travel speed is in the range of 1 to 25 inches per minute or 15 to 25 inches per minute.

Figure 3:
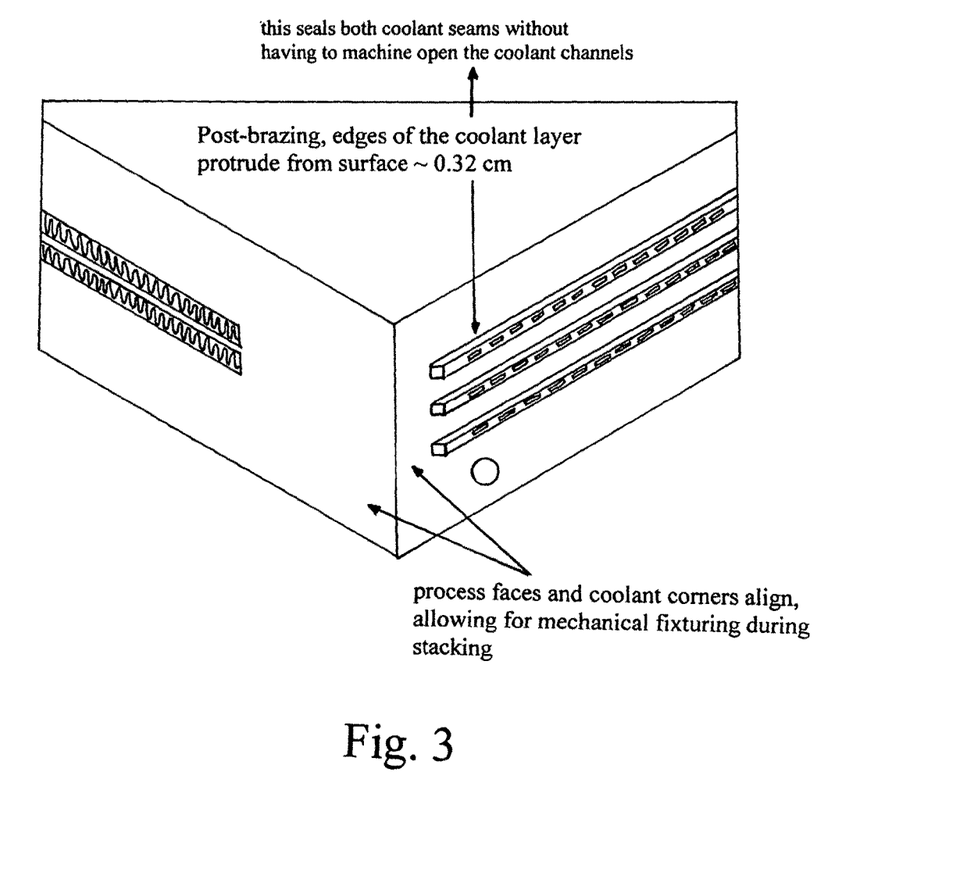
FIG. 3 shows coolant channels protruding out from coolant face in a Fischer-Tropsch reactor core.

The inventive process can be used to seal protruding features in laminated devices. An example is shown in FIG. 3. As with all aspects of the invention, the invention includes structures formed by the methods of the invention.

Shim side repairs
  One option to seal leaks along the shim side of a device, is to seal along the protruding edges of the shims. As shown in FIG. 3, the CMT may weld in the resultant corner which is 0.125" away from the end of the laminate as shown in FIG. 3.

Figure 4:
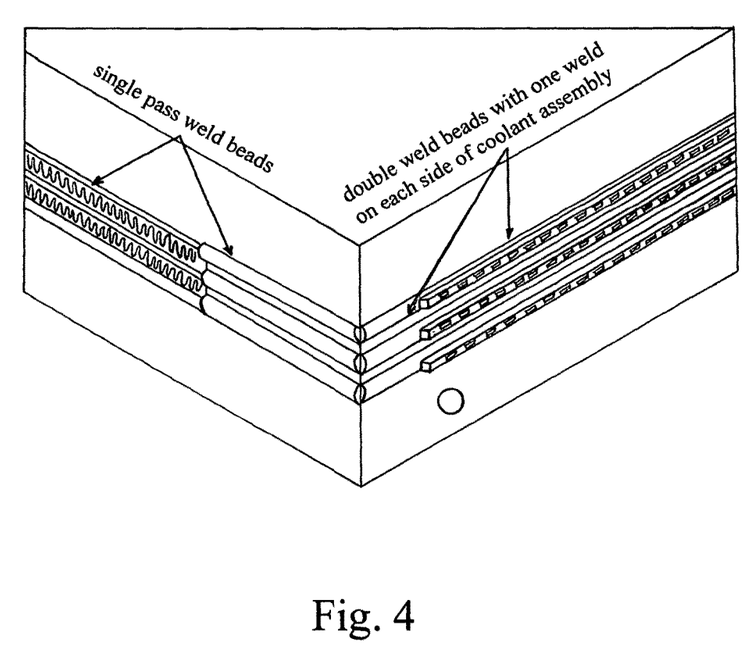
FIG. 4 is a view showing repaired braze seams on test FT reactor.

Identify start and stop point of repair based on previously collected leak test results
Program robot for start and stop points with wire placed about 1.5 wire diameters away from the seam to be repaired
  Surface preparation:
    Wire brush seam prior to repair
    Wipe seam with acetone
  Set Weld Parameters:
    Feed angle=10°
    Wire feed speed=150 inches per minute
    Arc Length Value=+3.0
    Travel Speed=20 inches per minute
  Run repair and visually inspect to ensure seam was covered
If seam was not fully covered in the known leak zone: grind down repair and perform second pass
Repeat until all coolant side zone leaks have been welded (see FIG. 4)
Post repair machining
  Mill/Grind down repair beads on faces in zones where rings will be attached to ~20 mil (500 microns) pad height
Post repair leak check
  Repeat leak test procedure to ensure that all leaks have been sufficiently sealed. If additional leaks exist, re-repair as necessary The invention includes apparatus in which sheets comprising channels protrude from a face of a core block. Advantageously, this design can be combined with welds along the protruded sheets that have superior leak resistance. In some preferred embodiments, the protruded sheets are enclosed within an enclosure of the type described herein.

Example 1

The brazed device was leak checked to confirm the presence of leaks. The device consisted of SS 304L laminates that are brazed with a nickel phosphorous (BNi6) interlayer (0.001" thick, 25 microns), brazed at 960 C for 1 hour with a pressure of 60 lbf per in2 (4 bar). If leaks were found then they were repaired using Cold Metal Transfer (CMT) welding. SS304L, 40 mil (100 microns) diameter filler wire was used for the repair.

For devices with fins or waveforms or channels that need to be kept clean of weld material, a shroud is placed over such areas prior to welding. It is preferred but not required that shrouds are placed over openings or sides of a device not undergoing welding while repairing an affected or leaky face of a device.

Figure 5:
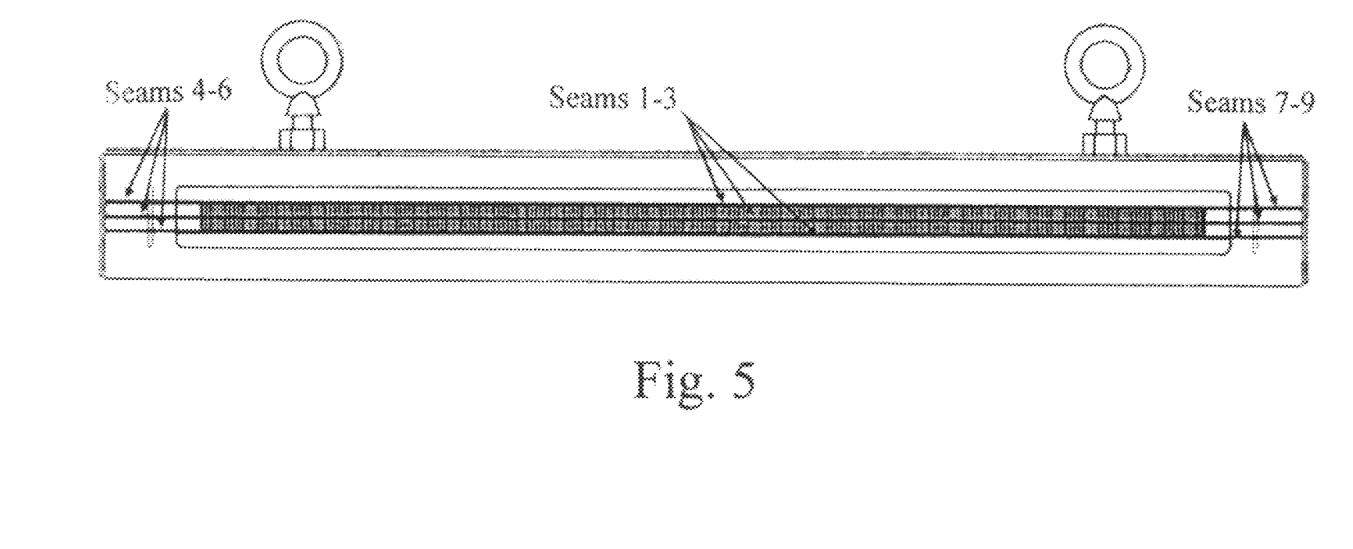
FIG. 5 is a view showing process face of small FT test reactor. Seams 1-3 are within the waveform zones (central region) of the reactor. Seams 4-9 are within the perimeter zones of the reactor.

Crack repair was accomplished on a device schematically illustrated in FIG. 5.
  Perimeter zone repairs
    Cover waveform sections preferably with high temperature ceramic tape to protect them (note: repairs are not occurring in zones directly adjacent to the copper waveforms).
    Identify start and stop point of repair based on leak test results
    Program robot for start and stop points with wire centered over seam to be repaired
    Surface prep prior to welding:
      Wire brush seam prior to repair
      Wipe seam with acetone
    Set weld parameters:
      Wire Feed Speed=120 inches per minute
      Arc Length Value=+3.0
      Travel Speed=20 inches per minute Run repair and visually inspect to ensure seam was covered
   If seam was not fully covered in the known leak zone: grind down repair and perform second pass
Repeat until all perimeter zone leaks have been welded The waveforms can be covered with a metal film to protect them during welding.

Example 2

Figure 6:
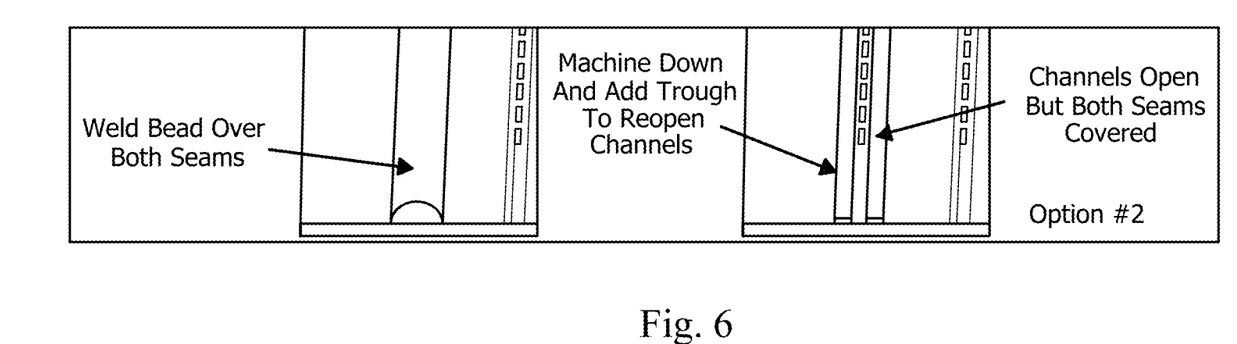
FIGS. 6-8 illustrate welding methods of sealing leaks in a laminated device.
Figure 7:
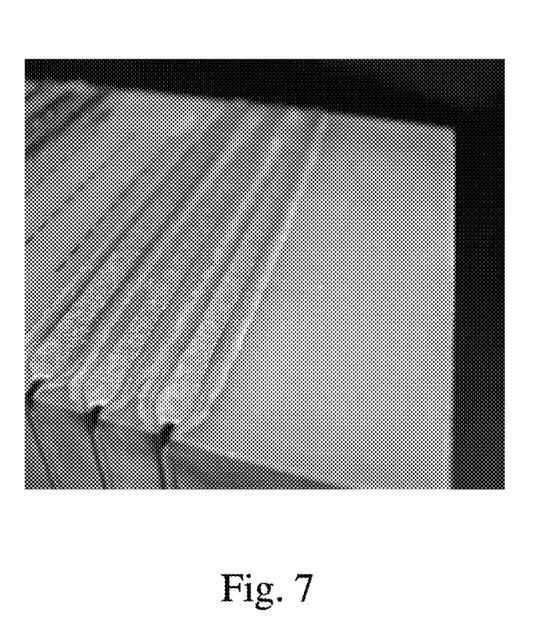
Figure 8:
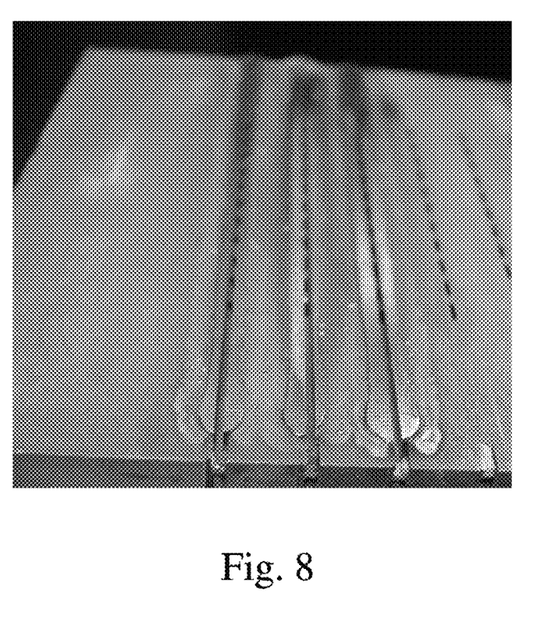

Alternate inventive methods for sealing leaks across brazed joints along shim or laminae. The seam or opening of the channel is welded over directly (preferably by CMT). The fully closed channels are then reopened using machining, plunge electro-discharge machining, Molecular Decomposition Process Grinding MDP, grinding or other process to reopen just the flow passage ways while leaving the brazed joint fully covered with the CMT weld. FIGS. 6-8 illustrate this process. Preferably, the welds are ground flat prior to machining to reopen the channels. The illustrated in the figures had a leak rate greater than 0.5 psig loss in 15 minutes at 100 psig fixed pressure before repair of the braze leaks with CMT and a leak rate less than 0.5 psig loss in 15 minutes at 100 psig fixed pressure after braze repair. This test can be used as a method to characterize preferred embodiments of the inventive apparatus. In each case, leak testing is conducted with nitrogen gas at room temperature.

The invention thus includes a method in which a weld is formed over apertures (channel openings) and weld material is then removed to reopen the channels—this method has been demonstrated to reduce leaking in a laminated device.

What is claimed:

1. Microchannel apparatus, comprising:
a core block comprising sheets of metal bonded together; plural microchannels disposed within the core block; the plural microchannels comprising plural apertures on one side of the core block; a solid-walled enclosure that encloses the plural apertures within a single, contiguous space; wherein the solid-walled enclosure comprises a solid, continuous wall that is welded on one side to the core block by a weld material; wherein the continuous wall has an aspect ratio of at least 10:1 of height to thickness where height is the direction that the wall projects from said one side of the core block, and thickness is perpendicular to height; wherein the solid-walled enclosure is open to an atmosphere.

* * * * *